Figure 1:
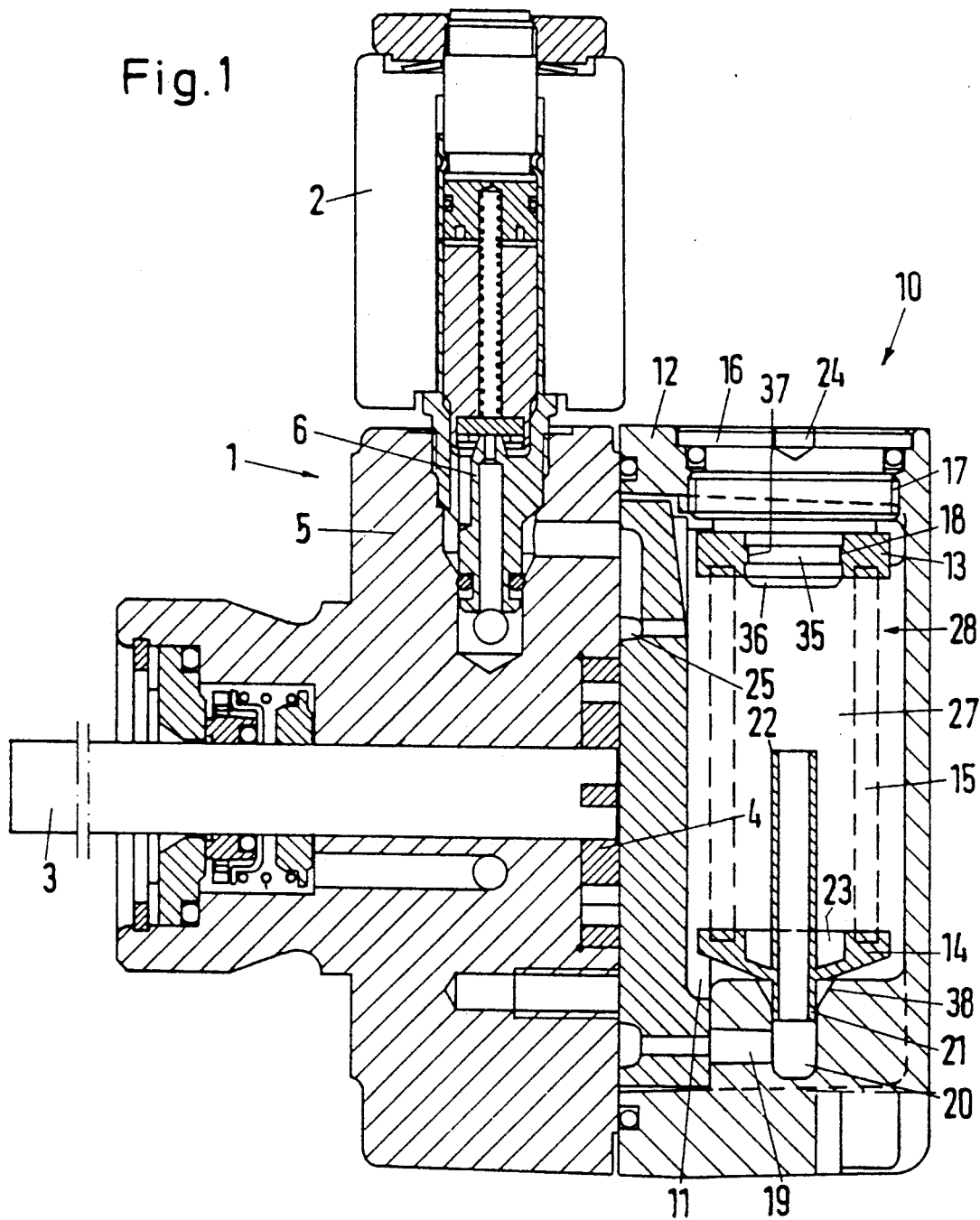

United States Patent [19]

Klausen et al.

[11] Patent Number: 5,085,769
[45] Date of Patent: Feb. 4, 1992

[54] FUEL FILTER ASSEMBLY FOR AN OIL BURNER PUMP

[75] Inventors: Jørn H. Klausen, Nordborg; Peter Frøslev, Sydals, both of Denmark

[73] Assignee: Danfoss A/S, Nordborg, Denmark

[21] Appl. No.: 546,864

[22] Filed: Jul. 2, 1990

[30] Foreign Application Priority Data

Jul. 20, 1989 [DE] Fed. Rep. of Germany ....... 3924096

[51] Int. Cl.⁵ .............................................. B01D 27/08
[52] U.S. Cl. .................................. 210/232; 210/299; 210/309; 210/352; 210/438; 210/454
[58] Field of Search ............... 210/232, 238, 248, 298, 210/308, 309, 407, 436, 437, 438, 450, 452–454, 493.2, 299, 352, 416.4; 418/47

[56] References Cited

U.S. PATENT DOCUMENTS

| | | | |
|---|---|---|---|
| 183,701 | 10/1876 | Pierce | 210/298 |
| 385,333 | 6/1888 | Way | 210/454 |
| 4,634,527 | 1/1987 | Marshall | 210/450 |
| 4,906,365 | 3/1990 | Baumann et al. | 210/238 |

FOREIGN PATENT DOCUMENTS

| | | | |
|---|---|---|---|
| 1044773 | 3/1954 | Fed. Rep. of Germany | 210/436 |
| 1054191 | 2/1954 | France | 210/454 |

Primary Examiner—W. Gary Jones
Assistant Examiner—Matthew O. Savage
Attorney, Agent, or Firm—Wayner B. Easton; Clayton R. Johnson

[57] ABSTRACT

An oil burner pump that includes a housing having a filter cartridge chamber that has an access opening which is closable by a removable cover. A filter cartridge is removable inserted into the chamber and is securable to the cover to be removed from the chamber when the cover is removed. The cartridge has opposite end portions and filter fabric extended between the opposite end portions, one of the end portions being removably securable to the cover.

7 Claims, 3 Drawing Sheets

FUEL FILTER ASSEMBLY FOR AN OIL BURNER PUMP

The invention relates to an oil burner pump comprising a housing and a filter arrangement which is disposed in the housing in a chamber accessible from the outside and closable by a cover and which is in the form of a filter cartridge of which the hollow cylindrical filter fabric interconnects two end elements.

Such an oil burner pump is known from EP 131 197 B1. To change the filter cartridge in the known arrangement, the cover has to be removed from the housing, whereupon the filter cartridge is accessible. The latter has to be removed from the chamber with the aid of a suitable tool or by hand. Since the cartridge almost fills the chamber, it can be difficult to obtain a suitable hold on the cartridge to pull it out.

It is therefore the problem of the invention to provide an oil burner pump in which the replacement or maintenance of the filter cartridge can be carried out in a simple manner.

This problem is solved in an oil burner pump of the aforementioned kind in that the filter cartridge is secured to the cover together with the end element which is adjacent to the cover.

By means of this construction, the filter cartridge and cover are mechanically interconnected so that, as the cover is removed from the housing, the filter cartridge is simultaneously withdrawn with it. When the cover is lifted off, the filter cartridge is pulled out of the chamber. The operator does not have to touch the cartridge but can hold it with the aid of the cover for inspection and/or maintenance purposes and view, clean or replace it. If it is found that the filter cartridge has to be replaced, the connection between the cover and cartridge can be undone. Since this can be done outside the pump, it is easy to do.

U.S. Pat. No. 3,312,344 discloses filtering means which can be introduced in and removed from a housing together with a cover. For this purpose, the filtering means are accommodated in a second housing connected to the cover by a central bolt projecting through the filter. To inspect, maintain or replace the filter, it is therefore not only necessary to remove the cover from the first housing but, after removal of the filtering means, also to release the second housing from the cover to obtain access to the filter.

In a preferred embodiment of the invention, the end element is connected to the cover by a snap connection, i.e. a connection in which one part releasably engages the other. A snap connection offers an adequate tensile and compressive strength to push the filter axially into or pull it out of the housing of the oil burner pump. However, if one applies a higher tensile or compressive force, the filter cartridge can be released from or placed on the cover without difficulty. This avoids the need for a special tool or special fastening elements to secure the filter cartridge to the cover that might otherwise make replacement take longer and therefore be more expensive. Since only one end element need be part of the snap connection, the cartridge cannot be wrongly built in.

With particular advantage, the cover is screwed on or into the housing. A screw connection in contrast with individual circumferentially distributed bolts for securing the cover to the housing has the advantage that the force distribution between cover and housing is more uniform, whereby the seal between cover and housing can likewise be simpler. This screw connection can make replacement or inspection of the cartridge more economical in time and money.

It is of advantage that the connection between the end element and cover should permit relative rotation between the filter cartridge and cover. This is of particular advantage when the cover is screwed into the housing of the oil burner pump or onto it, i.e. executes rotation about its screw axis during securing to the housing. The possibility of rotation between the cover and cartridge permits the cartridge nevertheless to be installed in a preferred angular position without impeding the screw connection between cover and housing.

In a preferred embodiment, a dirt trap is formed with the aid of the end element of the cartridge that is remote from the cover. This dirt trap catches the particles which the filter fabric has filtered out of the oil and which can become loose from the fabric upon movement of the cartridge, thereby preventing the particles from dropping into the chamber and soiling same. During installation and dismantling of the cartridge, it is therefore not necessary to clean the cartridge-receiving chamber in a separate operation.

Advantageously, the chamber is accessible from a side of the housing opposite to a suction and a return connection. In this way, building-in and dismantling of the filter cartridge is not impeded by the suction and return conduit.

It is also favourable for the chamber to be accessible from the top of the housing. This takes into account the fact that the suction and return connections in an oil burner pump are usually disposed at the bottom. Above all, one can pull out the filter cartridge upwardly in a vertical direction. No oil is lost in the process. Any oil still in the cartridge can run off downwards, i.e. into the chamber. This prevents unnecessary soiling around the pump when changing the cartridge. In addition, no air can enter the system. After replacing the cartridge, operation can be restarted rapidly because a check for entered air, monitoring the function of the cut-off valve and possible venting can be dispensed with.

In a preferred embodiment, the end element of the cartridge that is remote from the cover comprises a supply connector which can be sealingly introduced in a housing passage and projects into the interior of the filter cartridge. The supply of oil is therefore at the end remote from the cover centrally into the cartridge interior. By reason of the fact that the supply connector is sealingly seated in a housing passage, an additional seal between the housing passage and the cartridge is dispensed with. It is not necessary for the connection between the housing passage and supply connector to be completely leakproof. It will be sufficient if the space or gap that might occur between the supply connector and housing passage is so small that the particles to be filtered out cannot pass through, i.e. if the gap width is less than the filter mesh. The particles are then forced to flow through the supply connector and collect at the filter fabric. By reason of the fact that the supply connector in the cartridge does not finish flush with the end element but projects further into the cartridge, an annular space is formed around the supply connector in which particles that could drop from the filter fabric upon movement of the cartridge can be trapped without sliding out of the cartridge again through the connector. The annular space thus forms a dirt catcher or dirt trap. This ensures that no particles can fall into the chamber during installation or dismantling of the filter cartridge. The supply connector introduced in the housing passage also accommodates length tolerances.

In another preferred embodiment, the end element remote from the cover projects radially outwardly beyond the filter fabric and lies against the inside of the chamber the projecting filter margin having at least one opening for the throughflow of oil. In this embodiment, the oil can penetrate the filter fabric from the outside to the inside. The oil is then supplied from the outside and flows off through an outlet provided in the interior of the chamber bounded by the filter cartridge. Since the projecting margin lies against the inside of the chamber, it can happen that particles will drop when the cartridge moves. However, these particles are caught by the projecting margin and moved out of the chamber. Further, the projecting margin has the advantage that, on pulling the cartridge out of the chamber, it cleans the inner wall of the chamber and frees it from any deposits. This has the advantage that the chamber does not have to be cleaned before a new cartridge is installed. In addition, the cartridge is automatically centered by the projecting margin during assembly.

It is here of particular advantage that the margin is elastic. This on the one hand permits the margin to lie uniformly against the inner wall of the chamber everywhere and can fulfill the cleaning and catching function as the cartridge is pulled out, even if the inner wall of the chamber is somewhat uneven, i.e. not quite smooth. On the other hand, certain unevennesses when screwing on the cover caused by not quite exact production of the screwthread in the cover and/or housing can be compensated without the projecting margin of the end element lifting off the inner wall of the chamber.

Advantageously, the end element of the filter cartridge remote from the cover is resilient, i.e. the end element fulfills the function of a spring between the attachment to the cover and attachment of the filter fabric. When the cover is screwed onto or into the housing, the cartridge is pressed under the force of this spring axially against an abutment face at the bottom of the chamber. This necessarily creates a certain seal between the filter cartridge and abutment face.

In a preferred embodiment, a spigot is provided centrally in the chamber and the cover is screwed onto the top of it. This embodiment is of particular advantage for large filters because the diameter of the screwthread can be kept small. The seal between cover and housing at the outer edge can be conventional, for example an O-ring.

In a particularly preferred embodiment, a closable venting aperture is connected to the return connection. Normally, the venting apertures, also termed venting screws, are provided on the pressure side of the pump. However, when the venting screw is disposed in the return path, one has the advantage that the pump will empty itself automatically if the venting aperture is open and the oil supply interrupted. When building in or removing the cartridge, this prevents too much oil from remaining in the oil burner pump that might soil the pump and its surroundings. The oil remaining in the pump is kept to a minimum.

Figure 3:
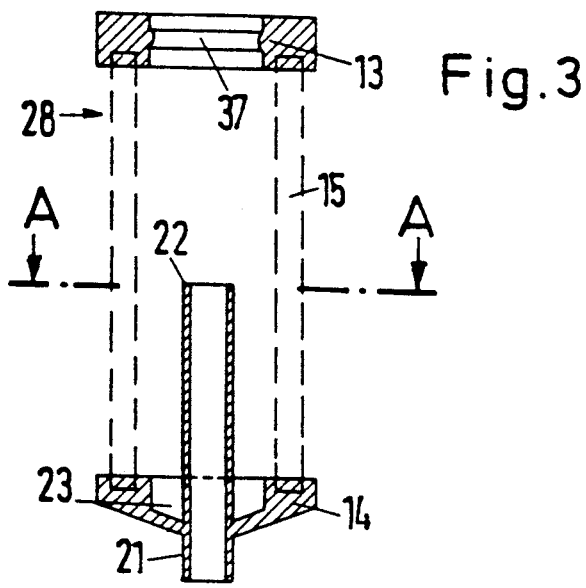
Figure 2:
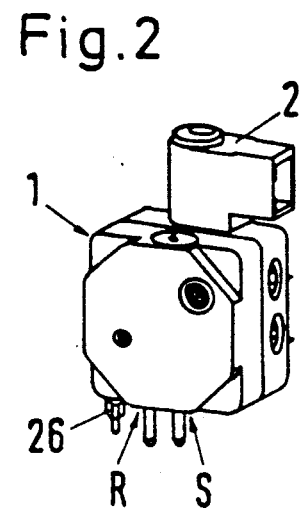
Figure 4:
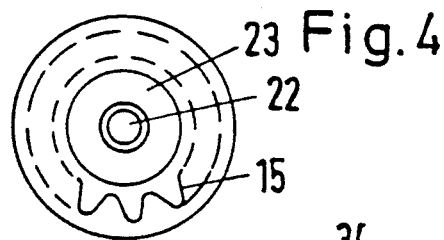
Figure 6:
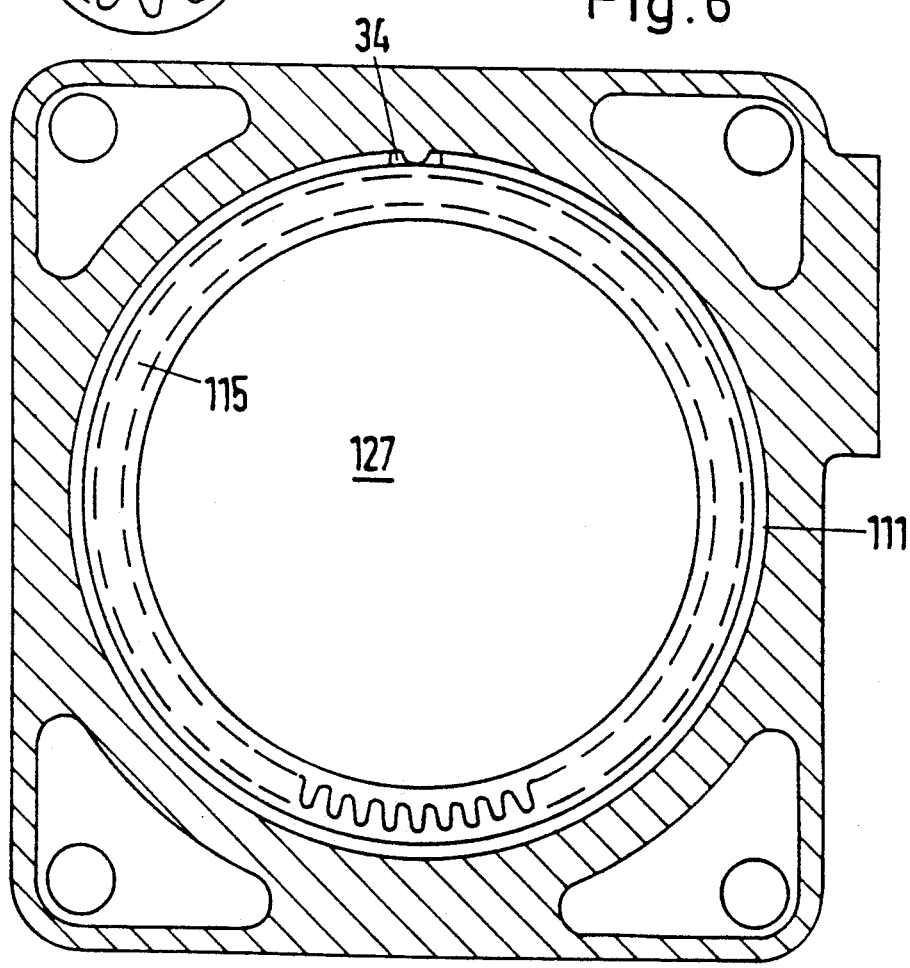
Figure 5:
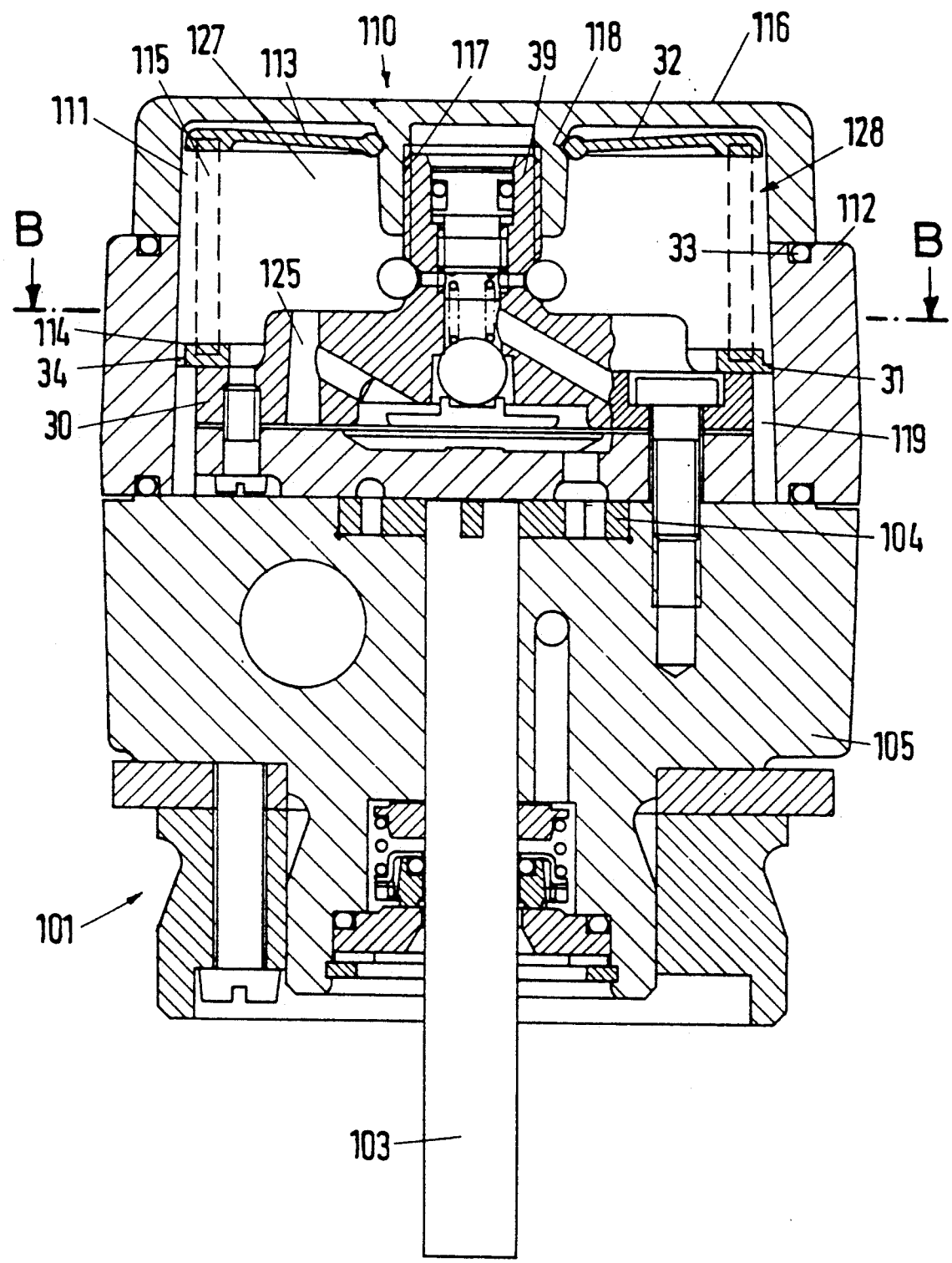

Preferred examples of the invention will now be described with reference to the drawing, wherein:

FIG. 1 is a section through an oil burner pump,
FIG. 2 is a perspective view of the pump,
FIG. 3 is a section through a filter cartridge,
FIG. 4 is a section on A—A in FIG. 3,
FIG. 5 shows a further embodiment of the oil burner pump, and
FIG. 6 is a section on B—B in FIG. 5.

An oil burner pump 1 comprises a magnetic stop valve 6 which is provided with a coil 2 and releases oil to the nozzle. A gear train 4 is driven by a shaft 3 and thus feeds oil from a suction line S to the pressure side of the pump. A valve (not shown) looks after distribution to the magnetic valve 6 and to the return.

Between the suction line S and the gear train 4 of pump 1 there is a filter arrangement 10. It comprises a chamber 11 arranged in a housing 12 connected to the housing 5 of pump 1. The filter arrangement 10 comprises a filter cartridge 28 having an upper end element 13 and a lower end element 14 interconnected by a filter fabric 15. The expression filter fabric is not restricted to a textile fabric. All types of filter material are possible, for example steel mesh, fine nets of steel or plastics in a plurality of layers or felt materials, and all kinds of filter shapes, e.g. cylindrical, smooth or folded to zig-zag form. The chamber 11 is closed by a cover 16 having a sealing ring and screwed into a screwthread 17 in housing 12. The upper end element 13 facing the cover is connected to the cover by a snap connection. The snap connection comprises substantially a circumferential groove 35 in a bolt-like projection 36 of cover 16 and a circumferential projection 37 which is in a hole of the end element 13 facing the cover and engages in the groove 35. It permits the filter cartridge 28 to be locked in the cover 16 and positively held therein. The snap connection can be loaded in tension and compression until the cartridge can be pushed into the chamber 11 and pulled out again without the snap connection 18 becoming undone. However, if a higher tensile force is applied, the cartridge 28 can be removed from the cover. Conversely, the cartridge 28 can be pushed on the cover when a higher force is applied than necessary for pushing the cartridge 28 into chamber 11. The snap connection is formed so that it permits relative rotation between cover 16 and cartridge 28. This is of particular advantage when the cartridge has already been introduced in the chamber so far that it is subjected to a certain amount of friction upon contact with the chamber base.

Upon further screwing in of the cover 16, one then does not additionally have to overcome the friction between the cartridge 28 and chamber base. Instead, the cover 16 turns freely in the snap connection 18 together with the cartridge 28.

The oil sucked through the suction line S flows through a housing passage 19 into the flanged end 20 of which a supply connector 21 of the end element 14 remote from the cover 16 has been introduced. The opposite end 22 of the supply connector 21 projects into the interior 27 of the filter and thereby forms an annular chamber 23 between itself and the filter fabric 15 or between itself and the outer margin of the end element 14 remote from the cover 16. As may be seen from FIG. 1, the outer diameters of the main body of the end element 14 and filter fabric are substantially greater than the outer diameter of suction line, including the parts of the supply connector which extends axially away from the element main body portion having the element maximum outer diameter in axial opposite directions. The oil then flows from the inside outwardly through the filter fabric 15 and leaves the chamber through an outlet passage 25 to be conveyed to the valve arrangement 6 by the gear pump 4.

If, now, the filter cartridge 28 has to be inspected, maintained or replaced, the cover 16 is screwed out. This can, for example, take place in that a suitable tool is applied to a torque applying surface 24. The torque applying surface 24 can, for example, be an internal hexagon. After loosening the screw connection 17 between cover 16 and housing 12, the cover can be pulled out of the housing 12 upwardly. It thereby takes with it the filter cartridge 28 which is connected to it by the snap connection. The attendant can now hold the unit consisting of cover 16 and cartridge 28 by the clean cover, inspect it and possibly replace it. Since replacement, i.e. separating the snap connection 18 between cover 16 and cartridge 28, takes place outside the pump, the attendant can take care that it will not soil him or the surroundings. Since small knocks are bound to occur as the filter cartridge 28 is pulled out of the housing 12 and shake the particles which have accumulated on the filter fabric 15 during filtering of the oil, one has to take precautions that the particles which drop off will not fall out of the cartridge 28 into the chamber and thus pollute the chamber. This purpose is served by the annular chamber 23 which is formed between the supply connector 21 and filter fabric 15 and is disposed between the end 22 of supply connector 21 and the lower end element 14 remote from the cover 16. All particles dropping from the filter fabric 15 are caught by the annular chamber 23 which serves as dirt trap. They can therefore not leave the cartridge 28 through the supply connector 21 as long as the cartridge 28 is in the chamber 11.

Upon reintroducing the cleaned cartridge 28 or a new one, the supply connector 21 of the filter cartridge 28 is engaged by a chamfer 38 of the flanged end 20 of the housing passage 19 and centered in the flanged end 20 which opens to the chamber 11 and in a direction axially away from the chamber and the cover. The supply connector 21 and the flanged end 20 are made to be an accurate fit so that, when the filter cartridge 28 has been brought completely to its operative position by screwing in the cover 16, a seal exists between the housing 12 and supply connector 21. This seal need not be fully leakproof. It is sufficient for it to be so tight that the particles to be filtered cannot pass through but must flow through the supply connector 21 into the interior 27 of cartridge 28.

FIG. 4 shows a section through cartridge 28. It will be seen that the filter fabric 15 meanaders in zig-zag fashion so that the largest possible filter area is made available to the oil flow.

A ventilating screw 26 communicates with the return line R. This ensures that, when the venting screw is loosened and the oil supply set, the oil can automatically flow out of the pump. This makes it possible substantially to empty the cartridge-receiving chamber, which may be of interest when the chamber is accessible from the side rather than the top. Even under this condition relatively little oil will be lost when changing the cartridge 28. Soiling of the pump or its surroundings is thereby substantially avoided.

FIG. 5 shows a further embodiment of oil burner pump in which parts corresponding to those in FIGS. 1 to 4 are provided with reference numerals increased by 100. The pump is usually installed with the shaft 103 horizontal.

Contrary to the FIGS. 1 to 4 embodiment, the cover 116 is here not screwed into the housing 112 but screwed onto a spigot 39 which is disposed centrally in chamber 111 and fixed to the housing 112. This embodiment is recommended especially for larger filter arrangements 110 processing a larger quantity of oil. This arrangement permits the screwthread 117 not to have the size of the outer circumference of the cover 116; it can be much smaller and is therefore more economical. In addition, a smaller thread can be opened and closed with the exertion of less torque, thereby simplifying a change of filter.

The annular end element 113 facing the cover 116 is at least partially in the form of a spring 32 is removably connected to the cover 116 by way of the radially inner snap connection 118. The spring 32 on the one hand ensures that the cover 116 can be brought so close to the housing 112, that a connection sealed by a seal 33 is achieved. On the other hand, the filter cartridge 128 can, with its end element remote from the cover 116, be pressed onto the base of chamber 111 or an abutment 30 provided for this purpose.

In the illustrated embodiment, the lower end element 114 remote from the cover 116 is annular, its radially outer margin projecting beyond the filter fabric 115 and lying against the inner wall of chamber 111, whereby the filter cartridge is centered in the interior of chamber 111. An orifice is provided at only a few positions, in the illustrated example at only one position 34, through which the oil conveyed through a housing passage 119 can enter the chamber 111. From there, the oil flows from the outside inwardly through the filter fabric 115 to flow through an outlet passage 125 towards the gear pump 104. The projecting margin (flange) 31 is elastic. If, now, the cartridge 128 is withdrawn upwardly after releasing the screw connection 117 of the cover 116 to the housing 112, one ensures on the one hand that particles separated from the filter fabric 115 as a result of vibrations will not fall into chamber 111 and soil same. On the other hand, one ensures that the projecting margin 31 cleans the inner wall of the chamber, i.e. frees it from possible impurities or coverings. This saves the additional step of cleaning chamber 111 when the filter cartridge 128 is replaced.

We claim:

1. Oil burner pump filter apparatus comprising a housing having a chamber that has an access opening, a cover removable from the housing for closing the access opening, and a filter cartridge removably insertable into the housing and having an interior, the cartridge having a first end portion, a second end portion and a hollow cylindrical filter fabric interconnecting the two cartridge end portions, the cartridge being removed from the chamber by removal of the cover from the housing, the cartridge and cover having cooperating means for securing the first end portion to the cover for movement therewith, the housing having a fluid passage portion opening into the chamber and extending axially from the chamber in a direction away from the cover, and the cartridge second end portion being more remote from the cover than the cartridge first end portion and having a main body portion defining a supply connector, said supply connector including a first tubular end portion extending axially away from the main body portion and into the passage portion in sealing relationship with the passage portion when the cover closes the access opening, the supply connector first end portion being of a substantially smaller outer diameter than the main body portion, said supply connector defining a passageway fluidly connecting said fluid passage portion to the cartridge interior for conducting oil therethrough.

2. An oil burner pump filter apparatus according to claim 1, wherein the cartridge second end portion has an annular chamber portion forming a dirt trap within the cartridge.

3. An oil burner pump filter apparatus according to claim 1, wherein the chamber access opening faces upwardly.

4. Apparatus according to claim 1, wherein the fluid passage portion has a chamfer part at a point where the fluid passage portion opens into the chamber.

5. Apparatus according to claim 1, wherein the supply connector has a second tubular end portion extending within the cartridge interior, axially away from the main body portion, and toward the cover to and in conjunction with the filter fabric provide an annular chamber.

6. The apparatus according to claim 5, wherein the cover is at a higher elevation than the main body portion and supply connector and that the housing has an outlet port opening to the housing interior at a higher elevation than the second tubular end portion of said supply connector.

7. Oil burner pump apparatus comprising a housing having a chamber that has an access opening, a cover removable from the housing for closing the access opening, and a filter cartridge removably insertable into the housing and having an interior, the cartridge having a first end portion, a second end portion and a hollow cylindrical filter fabric interconnecting the two cartridge end portions, the housing having a first portion defining a chamber bottom abutment face for having the cartridge second end portion abut thereagainst, the cartridge being removed from the chamber by removal of the cover from the housing, the cartridge and cover having cooperating means for securing the first end portion to the cover for movement therewith, the cooperating means including a first cylindrical portion on said cover having a substantially smaller outer diameter than the inner diameter of each of the cylindrical filter fabric and the cartridge first end portion, the cartridge first end portion including annular spring means for resiliently urging the filter fabric in a direction toward the bottom abutment face and therethrough spring press the cartridge second end portion against the abutment face when the cover closes the access opening, said annular spring means having a radially inner portion, said radial inner portion including means for forming a removable connection to said first cylindrical portion with said first cylindrical portion extended therethrough, wherein the housing includes a spigot having external threads coaxially arranged within said filter cartridge, said first cylindrical portion having internal threads threadably engagable with the external threads on said spigot for removably attaching the cover to the housing, and said means for forming a removable connection comprises means for defining a snap connection for releasably securing the cartridge to the cover.

* * * * *